Patented Jan. 30, 1951

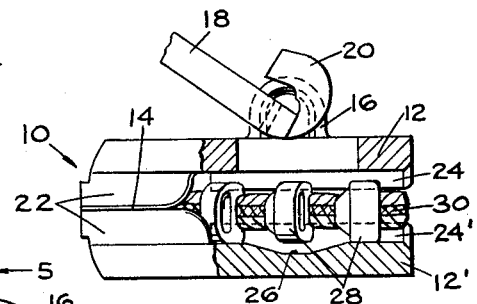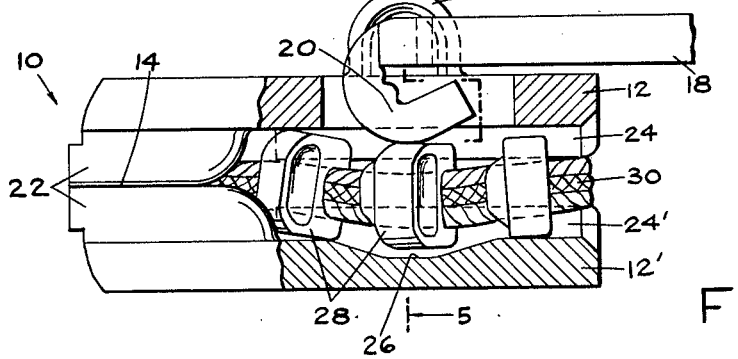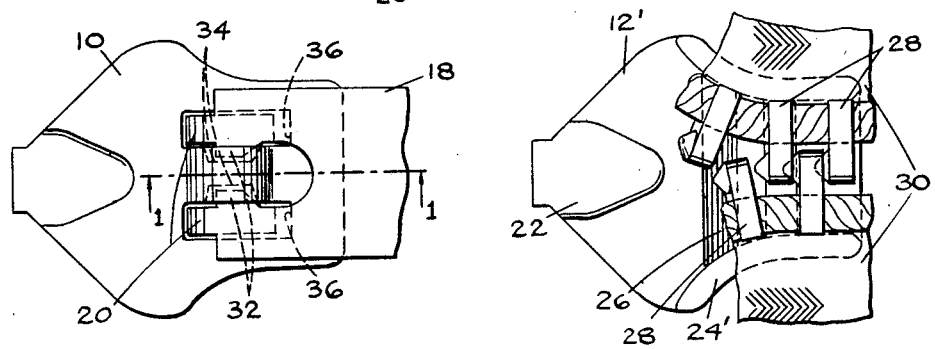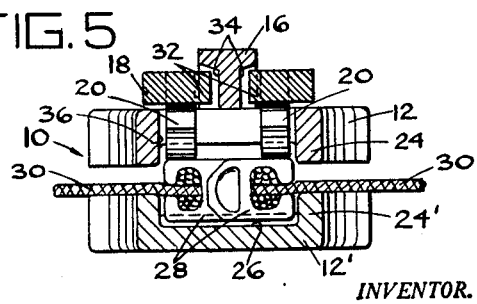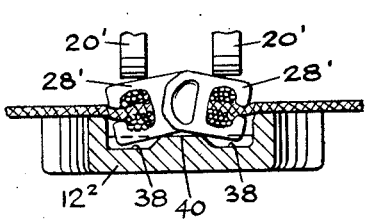

2,539,520

UNITED STATES PATENT OFFICE 2,539,520

FRICTION LOCK SLIDER FOR SLIDE FASTENERS

William Mikulas, West Brighton, N. Y., assignor to Conmar Products Corporation, Newark, N. J., a corporation of New Jersey Application August 29, 1945, Serial No. 613,241

11 Claims. (Cl. 24—205.14)

This invention relates to lock sliders for slide fasteners and more particularly to so-called friction lock sliders.

In order to prevent undesired opening of a slide fastener when applied to an article, lock sliders of various types have been designed and are being used. According to one of these types the slider is locked against movement in in fastener opening direction when a normal cross pull tending to separate the stringers is exerted on the fastener, but is permitted to yield and move relatively to the fastener stringers when the pull tending to open the fastener is excessive or forced. This type of lock slider, referred to as friction lock slider, is used on certain articles of clothing, such as men's trousers, to take care of excessive or forced tearing stresses. It frequently happens in such use that a tearing stress is applied to a slide fastener, with the slider in a partially opened position, great enough to urge the slider to move toward a further or even completely opened position. Where the locking element engages between the fastener elements, as in the so-called "pin lock" slider, such an excessive or forced stress is liable to result in the tearing away of single slide fastener elements, thus rendering the slide fastener useless. However, forced movement of a slider in which the locking action depends upon frictional engagement of the slider with the fastener elements (friction lock slider) does not thus destroy the usefulness of the fastener. Such forced opening movement in friction lock sliders of known construction does, however, eventually result in ineffectiveness of the locking means. The prime object of the present invention is to improve sliders of the friction lock slider type so as to maintain their effectiveness in use.

In known constructions of friction lock sliders, the locking action is achieved by pressing or clamping parts of the slider from opposite sides against the fastener elements. The pressing or clamping force used amounts to several pounds; and since the clamping takes place in the proximity to the rigid neck or "diamond" connection of the two slider wings, where there is little resilience, any substantial strain placed upon the slider and fastener elements by a forced moving of the slider, and particularly after such forced operations are repeated, usually impairs the further locking operation of the slider, the reason for this impairment being that the slider and/or fastener elements become worn, displaced, deformed or in other ways injured, or the firmness of attachment of the fastener elements becomes lessened. It is another object of this invention to provide a friction lock slider construction wherein the injury caused to slider or slide fastener elements by a forced moving of the locked slider is minimized or eliminated.

These defects of known constructions of friction lock sliders and the improvement achieved by the present invention may also be explained quantitatively. In known constructions the resistance offered by the friction locking means against the first forced opening or stroke of the slide fastener may be as high as 20 pounds, and then may be as much as 4 to 6 pounds (a normal requirement) for the next ten forced strokes, but then rapidly drops over the next 100 to 200 strokes from 4 pounds to a totally inadequate 1 pound resistance. With repeated forced openings of the slide fastener, the mechanical results are spread slider wings, wearing of the fastener elements, displacement of the fastener elements, wear of the locking cams and trunnions of the pull, and wear of the trunnion bearings for the slider pull; and these mechanical defects account for the rapid decrease in the serviceability or use of the friction locking function.

In the improvement of the present invention, the resistance offered to the first 15 or 20 forced openings of the slide fastener is uniformly of the order of 4 pounds (a normal requirement) and this is substantially maintained over hundreds of subsequent forced openings, the resistance being of the order of 3 pounds, for example, after hundreds of forced opening strokes are produced. No mechanical impairment of the slider parts such as is incident to known friction lock sliders is discernible, this accounting for the maintained resistance of the friction lock slider to repeated forced openings. A friction lock slider having a greatly enhanced useful life is thus obtained.

Many suggestions have been made to improve friction lock slider constructions by increasing the resilience of the slider parts concerned, for instance, by providing resilient slider parts to be clamped against the fastener elements, or by providing a resilient connection between the locking means and its point of attachment to the slider. All of the prior constructions depend on the clamping of more or less rigid slider parts or separate parts from two opposite sides against the fastener elements. The friction lock slider of the present invention deviates from this prior practice and embodies an entirely new principle in which dependence for the locking friction is had on the resilience of the fastener stringers. An important object of this invention is, therefore, the provision of a friction lock slider where the clamping force is derived from the resilience of the fastener stringers instead of from the parts of the slider.

In friction lock sliders, friction is produced between the fastener elements on the one hand and the slider parts including the pull and the locking element on the other hand. It has been found that the detrimental wear caused to the bodies movable relatively to each other can be minimized by using harder metal for the pull and locking element than for the fastener elements since the small area of the locking element which is brought in successive contact with many fastener elements, is subjected to greater wear. Accordingly, it is a further object of the invention to choose the materials for the slider pull and fastener elements so as to insure the least wear.

To the accomplishment of the foregoing prime objects and such other objects as may hereinafter appear, my present invention relates to the friction lock slider and its component parts as sought to be defined in the appended claims and as described in the following specification, taken together with the accompanying drawing in which:

Fig. 1 is a partially sectioned side view of a friction lock slider embodying the features of the present invention, the section being taken through the slider body in the plane of the line 1—1 of Fig. 3, this view showing the slider in the unlocked condition;

Fig. 2 is an enlarged view, similar to Fig. 1, showing the slider in the locked condition;

Fig. 3 is a plan view of the slider, with a part of the pull broken away;

Fig. 4 is a plan view of the rear wing of the slider, this view showing portions of two slide fastener stringers in operative engagement;

Fig. 5 is a section, on an enlarged scale, taken in the plane of the line 5—5 of Fig. 2; and Fig. 6 is a view similar to Fig. 5, with parts omitted, this view illustrating a modification of the invention.

Referring now more in detail to the drawings and having reference first to Figs. 1 to 5 thereof, the slider comprises a slider body 10 having a front wing 12 and a rear wing 12' spacedly connected at one end as at 14. The front wing 12 is provided with a support in the form of a lug 16 for pivotal support of the friction locking element, which latter may comprise a pull device 18 having adjacent to its lug supported end a friction locking element or elements which as usual may consist of a cam element or cam elements 20. The connected ends 14 of the wings define the neck or so-called "diamond" 22 of the slider; and the wings 12 and 12' may be formed as usual with the side flanges 24 and 24' respectively. The wings together with the neck or diamond 22 and the side flanges 24, 24' define a Y-shaped channel for the slide fastener stringers. Thus far the slider described is a conventional friction lock slider structure.

According to the principles of the present invention, the frictional locking force for the slider is derived from the resilience of the fastener stringers obtained by flexing the fastener stringers out of the path of their normal linear movement through the slider. To accomplish this the slider rear wing 12' is provided with a recessed part 26 opposite the locking element or cam (or cams) 20, the said recessed part functioning to permit a transverse deflection or depressing of one or more of the fastener elements 28 which is or are bodily engaged by the locking element or cam 20 when the latter is moved to its locking position. This is best shown in Fig. 2 of the drawings. This transverse deflection of the engaged fastener element produces a transverse flexing of one or both of the stringers 30, 30 of the slide fastener.

More specifically stated, use is thus made of the resiliency of the slide fastener stringer or stringers 30 for effecting the friction lock slider action between a locking cam 20 and a bodily engaged element (or elements) of the slide fastener elements 28. This resiliency becomes effective as best depicted in Fig. 2 upon the deflection or depression action of the bodily engaged fastener element or elements. This resiliency results from the flexing of the stringer or stringers in a direction transversely of the stringers and produces what may be described as a flexural force of the slide fastener stringers. With the depressing or flexing of the stringers as shown in Fig. 2, it will be understood that those stringer portions which are caused to be bent out of the normal linear path of movement of the stringers acquire the tendency to straighten out again, and it is the force derived from this tendency which urges the deflected fastener elements against the locking element or cams. Thus in the locking condition of the pull 18 shown in Fig. 2 the fastener elements 28 which are depressed, and which due to the flexural resilience of the stringers reactively press against the locking elements or cams 20, produce the friction locking of the slider.

To permit relative longitudinal movement between the friction locked slider and the stringers under a forced opening of the slide fastener, the recessed part 26 of the rear wing 12' of the slider is so shaped and spaced from the deflected or depressed slide fastener elements that the engaged fastener element or elements moving through its or their deflected path is or are free of the walls of said recessed part. The recessed part 26 is, therefore, made to define a cavity which is substantially concave longitudinally of the slider, as best shown in Fig. 2. Preferably this cavity is made deep enough and is so concavely contoured as to obviate any contacting engagement between a deflected slide fastener element and the cavity walls, as shown (and somewhat exaggerated) in Fig. 2 of the drawings. The important thing to observe, however, is that even though the deflected slide fastener element may be made to physically engage the walls of the cavity, such deflected element should be free of the cavity walls in the sense that the deflected fastener elements should not in any way be impeded by the cavity walls from freely moving through their deflected path (when the locking element is in its locking condition) under a forced or excessive opening movement of the slide fastener. For this purpose the cavity has gradually sloping walls.

When the pull 18 and its locking element are moved to the unlocking position shown in Fig. 1 of the drawings, the locking element or cam 20 is moved to a position out of bodily engagement with the slide fastener elements, and the stringers 30 are thus released from their flexed condition and are permitted to move through the slider in their usual longitudinally linear paths as shown in Fig. 1 of the drawings.

The construction and support of the pull 18 and the cams 20, 20 when two cam elements are used may be of conventional design and this is best shown in Figs. 3 and 5 of the drawings. The pull 18 mounted on the slider body 10 is formed with two transversely spaced cam elements 20, 20 and with two trunnions 32, 32 which trunnions are supported in recessed bearings 34, 34 formed in the supporting lug 16. The cams 20, 20 when in bodily engagement with the fastener elements project into one or more openings 36, 36 formed in the front wing 12. Where two locking or cam elements 20, 20 are employed spacedly as shown, they are made to cooperate with two mating slide fastener elements 28, 28 of both stringers 30, 30 so that the mating fastener elements are depressed towards the cavity 26 and so that both stringers 30, 30 are transversely and simultaneously flexed. This is best shown in Fig. 5 of the drawings.

According to the modification of the invention, shown in Fig. 6 of the drawings, use is made not only of the above referred to transverse flexural force of the stringers, but also of a force derived from the tendency of the interlocked fastener elements to straighten out when flexibly flexed rotationally about the medial longitudinal line of the slide fastener. This tendency (rotational flexural force of the slide fastener) aids in increasing the upward directed pressure of the deflected slide fastener elements against the locking elements. In order to produce this rotational flexing force, the rear wing $12^2$ (Fig. 6) is provided medially of its recessed parts 38, 38 with a projection or ridge 40 which is active on the fastener elements 28', 28' transversely deflected by the cam elements 20', 20' to produce a rotational flexing of the fastener elements 28', 28' about the longitudinal medial line of the slide fastener (i. e., the axis of the interengaging parts of the fastener elements). This action is depicted in Fig. 6 of the drawings. This rotational flexure is thus in addition to the produced transverse flexing described; and the resultant of both flexure forces is exerted between the fastener elements 28', 28' and the cam elements 20', 20' to produce the frictional locking action.

The pull 18 and its cam elements 20, 20 are preferably made from a harder metal than the fastener elements. For example, they may be made from hardened steel when the fastener elements are made from an alloy generally known as nickel-silver, or from nickel-silver when the elements are made from brass or aluminum. Thereby detrimental wear of the locking elements is effectively minimized.

The principles of the friction lock slider of my present invention and the many advantages resulting from the construction thereof will now be fully apparent from the above detailed description thereof. In this friction lock slider dependence for the locking friction is had on the resilience of the fastener stringers, instead of on the resilience obtained from parts of the slider. The desired amount or degree of frictional resistance is substantially maintained or preserved throughout a lengthened useful life of the lock slider. By deriving the clamping force for the frictional locking means from the resilience of the fastener stringers instead of from the slider parts, those strains upon the slider parts which in prior friction lock sliders have caused those described mechanical defects to take place which impair or destroy the usefulness of the lock slider, are obviated or eliminated. The useful life of the friction lock slider of the present invention is thus much longer than devices of known constructions.

While I have shown my invention in preferred embodiments, it will be understood that many changes may be made in the construction and arrangement of the parts thereof without departing from the spirit of the invention defined in the following claims.

I claim:

1. A friction lock slider for a slide fastener of the type having two stringers carrying series of interengaging fastener elements, said slider comprising a body having a front wing and a rear wing spacedly united and defining therebetween a guide channel for the fastener elements, a friction locking element mounted on said slider front wing projecting through an opening in said front wing into said guide channel, said locking element being movable between an unlocking position when it is out of bodily engagement and a locking position when it is moved into bodily engagement with the fastener elements of at least one of said stringers, the slider rear wing having a recessed part opposite said locking element to permit a stringer flexing transverse deflection of a fastener element bodily engaged by said locking element when it is moved to its locking position, said recessed part having walls gradually sloping in opposite directions substantially longitudinally of the slider, the said stringer flexing producing the force for friction engagement between the locking element and the bodily engaged fastener element and for the consequent friction locking of the slider, the recessed depth of the said recessed part being such that the engaged fastener element is free of the walls of said recessed part even when engaged by the locking element, whereby relative longitudinal movement between a friction locked slider and the stringers is permitted in response to an excessive force which is effective to produce such relative movement.

2. A friction lock slider for a slide fastener of the type having two stringers carrying series of interengaging fastener elements, said slider comprising a body having a front wing and a rear wing spacedly united and defining therebetween a guide channel for the fastener elements, a pull mounted on the front wing and provided with a friction locking element projecting through an opening in said front wing into said guide channel, said locking element being movable by movement of said pull between an unlocking position when it is out of bodily engagement and a locking position when it is moved into bodily engagement with the fastener elements of at least one of said stringers, the slider rear wing having a recessed part opposite said locking element to permit a stringer flexing transverse deflection of a fastener element bodily engaged by said locking element when it is moved to its locking position, said recessed part having walls gradually sloping in opposite directions substantially longitudinally of the slider, the said stringer flexing producing the force for friction engagement between the locking element and the bodily engaged fastener element and for the consequent friction locking of the slider, the recessed depth of the said recessed part being such that the engaged fastener element is free of the walls of said recessed part even when engaged by the locking element, whereby relative longitudinal movement between a friction locked slider and the stringers is permitted in response to an excessive force which is effective to produce such relative movement.

3. The friction lock slider of claim 1 in which the locking element comprises a cam.

4. The friction lock slider of claim 1 in which the said rear wing is provided medially of its recessed part with a projection which is active on the transversely deflected fastener element to produce a rotational flexing of the fastener elements about the longitudinal medial line of the slide fastener in addition to the produced transverse flexing.

5. The friction lock slider of claim 1 in which the said recessed part defines a cavity substantially concave longitudinally of the slider.

6. A friction lock slider for a slide fastener of the type having two stringers carrying series of interengaging fastener elements, said slider comprising a body having a front wing and a rear wing spacedly united and defining therebetween a guide channel for the fastener elements, a friction locking means comprising two transversely spaced cam elements mounted on said slider front wing projecting through openings in said front wing into said guide channel, said cam elements being movable between an unlocking position when they are out of bodily engagement and a locking position when they are moved into bodily engagement with the fastener elements of the two said stringers, the slider rear wing having recessed parts opposite said cam elements to permit a stringer flexing transverse deflection of the fastener elements bodily engaged by said cam elements when they are moved to their locking position, said recessed parts having walls gradually sloping in opposite directions substantially longitudinally of the slider, the said stringer flexing producing the force for friction engagement between the cam elements and the bodily engaged fastener elements and for the consequent friction locking of the slider, the recessed depth of the said recessed parts being such that the engaged fastener elements are free of the walls of said recessed parts even when engaged by the locking elements, whereby relative longitudinal movement between a friction locked slider and the stringers is permitted in response to an excessive force which is effective to produce such relative movement.

7. The friction lock slider of claim 6 in which the said rear wing is provided medially of its recessed parts with a ridge which is active on the transversely deflected fastener elements to produce a rotational flexing of the fastener elements about the longitudinal medial line of the slide fastener in addition to the produced transverse flexing.

8. The friction lock slider of claim 1 in which the friction locking element is made of a metal harder than that of the fastener elements.

9. A friction lock slider for a slide fastener of the type having two stringers carrying series of interengaging fastener elements, said slider comprising a body having a front wing and a rear wing spacedly united and defining therebetween a guide channel for the fastener elements, a friction locking element mounted on said slider front wing projecting through an opening in said front wing into said guide channel, said locking element being movable between an unlocking position when it is out of bodily engagement and a locking position when it is moved into bodily engagement with the fastener elements of at least one of said stringers, the slider rear wing having a recessed part opposite said locking element to permit a stringer flexing transverse deflection of a fastener element bodily engaged by said locking element when it is moved to its locking position, said recessed part being shaped with walls gradually sloping in opposite direction substantially longitudinally of the slider in order to receive but not to retain its deflected fastener element, the recessed depth of said recessed part being such that it is solely the said stringer flexing which produces the force for friction engagement between the locking element and the bodily engaged fastener element and for the consequent friction locking of the slider, whereby relative longitudinal movement in fastener opening direction between a friction locked slider and the stringers is permitted in response to an excessive force which is effective to produce such relative movement.

10. A friction lock slider for a slide fastener of the type having two stringers carrying series of interengaging fastener elements, said slider comprising a body having a front wing and a rear wing spacedly united and defining therebetween a guide channel for the fastener elements, a pull mounted on the front wing and provided with a friction locking element projecting through an opening in said front wing into said guide channel, said locking element being movable by movement of said pull between an unlocking position when it is out of bodily engagement and a locking position when it is moved into bodily engagement with the fastener elements of at least one of said stringers, the slider rear wing having a recessed part opposite said locking element to permit a stringer flexing transverse deflection of a fastener element bodily engaged by said locking element when it is moved to its locking position, said recessed part being formed by walls gradually sloping in opposite directions substantially longitudinally of the slider, the recessed depth of said recessed part being such that it is solely the said stringer flexing which produces the force for friction engagement between the locking element and the bodily engaged fastener element and for the consequent friction locking of the slider, whereby relative longitudinal movement in fastener opening direction between a friction locked slider and the stringers is permitted in response to an excessive force which is effective to produce such relative movement.

11. A friction lock slider for a slide fastener of the type having two stringers carrying series of interengaging fastener elements, said slider comprising a body having a front wing and a rear wing spacedly united and defining therebetween a guide channel for the fastener elements, a friction locking means comprising two transversely spaced cam elements mounted on said slider front wing projecting through openings in said front wing into said guide channel, said cam elements being movable between an unlocking position when they are out of bodily engagement and a locking position when they are moved into bodily engagement with the fastener elements of the two said stringers, the slider rear wing having recessed parts opposite said cam elements to permit a stringer flexing transverse deflection of the fastener elements bodily engaged by said cam elements when they are moved to their locking position, said recessed parts each being formed by walls gradually sloping in opposite directions substantially longitudinally of the slider, the recessed depth of said recessed parts being such that it is solely the said stringer flexing which produces the force for friction engagement between the cam elements and the bodily engaged fastener elements and for the consequent friction locking of the slider, whereby relative longitudinal movement in fastener opening direction between the friction locked slider and the stringers is permitted in response to an excessive force which is effective to produce such relative movement.

WILLIAM MIKULAS.

REFERENCES CITED

The following references are of record in the file of this patent:

UNITED STATES PATENTS

| Number | Name | Date |
|---|---|---|
| 1,919,662 | Legat | July 25, 1933 |
| 2,193,080 | Soave | Mar. 12, 1940 |
| 2,240,704 | Lange | May 6, 1941 |